United States Patent [19]

Tamura

[11] Patent Number: 4,465,939

[45] Date of Patent: Aug. 14, 1984

[54] IMAGE READING APPARATUS HAVING A PLURALITY OF IMAGE SENSORS

[75] Inventor: Yasuyuki Tamura, Kawasaki, Japan

[73] Assignee: Canon Kabushiki Kaisha, Tokyo, Japan

[21] Appl. No.: 293,880

[22] Filed: Aug. 18, 1981

[30] Foreign Application Priority Data

Aug. 25, 1980 [JP] Japan ................................ 55-116845

[51] Int. Cl.$^3$ ........................ G06K 9/34; H04N 1/10
[52] U.S. Cl. .................................. 250/578; 358/294; 382/67
[58] Field of Search ............... 250/578, 208, 209, 235; 358/212, 213, 293, 294; 382/67, 68, 44

[56] References Cited

U.S. PATENT DOCUMENTS

| 4,200,788 | 4/1980 | Agulnek ........................... 250/578 X |
| 4,249,217 | 2/1918 | Korte et al. ..................... 358/213 X |
| 4,272,756 | 6/1981 | Kakumoto et al. ............... 382/44 X |
| 4,337,394 | 6/1982 | Fukushima ...................... 250/578 X |
| 4,358,794 | 11/1982 | Kurakami et al. ............. 250/578 X |
| 4,370,641 | 1/1983 | Kantor et al. .................. 250/578 X |

Primary Examiner—David C. Nelms
Assistant Examiner—Edward P. Westin
Attorney, Agent, or Firm—Fitzpatrick, Cella, Harper & Scinto

[57] ABSTRACT

An image reading apparatus utilizing two one-dimensional image sensors arranged to have mutually overlapping sensing fields. A common fixed target provided in the overlapping portion of the sensing fields is viewed by two sensors and is utilized for automatically compensating for the signals from the overlapping portion.

6 Claims, 5 Drawing Figures

IMAGE READING APPARATUS HAVING A PLURALITY OF IMAGE SENSORS

BACKGROUND OF THE INVENTION

1. Field of the Invention

The present invention relates to an image reading apparatus adapted for use in copiers, facsimile apparatus or the like, and more particularly to such image reading apparatus utilizing solid-state image sensors.

2. Description of the Prior Art

The use of CCD image sensors or MOS image sensors for original reading in copiers or facsimile apparatus has been proposed in recent years.

Such an image sensor utilized for original reading is generally of an one-dimensional type capable of electrical scanning in the principal scanning direction to obtain density information of a one-dimensional image in the form of time-sequential signals. Auxiliary scanning is achieved by relative displacement of the original with respect to the sensor, thereby converting the pattern of a two-dimensional original into time-sequential electric signals, which are transmitted through a transmission line to other devices such as recorder a or memory for further processing such as printing or display.

The commercially available image sensor such as a CCD is constrained, in obtaining high-quality image signals at a high speed, by the limitation in number of pixels or picture elements of the image sensor. The highest number of pixels available in the currently commercialized one-dimensional sensors is on the order of 2048, which only provides a pixel density of about 6.9 pixels/mm in reading an original of A3 size (297×420 mm) even when the principal scanning is conducted parallel to the shorter edge thereof. An image sensor with a larger number of pixels, which would provide a higher pixel density, is technically difficult to realize and would be expensive even if made technically feasible.

In order to avoid the above-mentioned difficulty, it has been proposed to increase the number of pixels by, as shown in FIG. 1, arranging plural image sensors CCD1, CCD2 in the lateral direction. In such a case, as shown in FIG. 2, signal reading clock pulses from a pulse source 4 are supplied to the first image sensor CCD1 to read a half of an original 1 reflected through a mirror 2 and a lens 3-1. Upon completion of the image reading by the first image sensor CCD1, the clock pulses are supplied to the second image sensor CCD2 to read the remaining half of the reflected image. The signals read from two image sensors are simply sent out in succession to obtain time-sequential image signals OUT similar to those obtained from a single image sensor.

However, the reading clock frequency in the CCD or MOS image sensors has an upper limit ordinarily on the order of 2 MHz or of 10 MHz for high-speed devices. This fact renders the high-speed reading difficult with the increase of the number of image sensors and gives rise to a slower image processing such as image printing.

As an example, two CCD's each having 2048 pixels and driven with a clock frequency of 2 MHz require 2.048 msec for each principal scanning and provide a density of about 13.8 pixels/mm for the shorter edge of the aforementioned A3-sized original. To obtain the same pixel density of 13.8 pixels/mm in the auxiliary scanning direction, the scanning over the longer edge (420 mm) will take as long as about 12 seconds. In actual application for example in a copier, the situation is aggravated because each principal scanning requires an additional time interval in order to match the start of the scanning operation with the printing cycle of the copier.

In order to obtain high-quality image signals at a high speed avoiding the above-mentioned difficulty, there has further been propopsed the following process. In said proposed process, with plural image sensors laterally arranged as shown in FIG. 1, the original is divided along the principal scanning direction into plural sections, which are simultaneously read respectively by plural image sensors. In this manner each slit line of the original image is read as plurally divided sections.

The information thus read by plural image sensors is temporarily stored in corresponding plural buffer memories, and is sequentially taken out to provide continuous information for one slit line. It is also possible to conduct the original reading simultaneously with the signal read-out from the memory if plural buffer memories are switchably provided for each image sensor. Such original reading process provides an improved resolving power and enables a high-speed reading.

Said process is however still associated with a drawback that the images read by plural image sensors may show aberration at the junction of neighboring images. In order that the images read by adjacent image sensors are made continuous, each image sensor has to be positioned with a precision of $10^{-3}$ mm or better, and such precision requires a highly sophisticated technology to achieve and has a certain limit.

Also even if such precision is achieved, each image sensor may be displaced afterwards under due to the effect of temperature, humidity or mechanical vibration, and such displacement will be fatal in an apparatus requiring a high resolving power.

SUMARY OF THE INVENTION

The object of the present invention is to provide an improved image reading apparatus utilizing plural image sensors.

Another object of the present invention is to provide an image reading apparatus enabling high-density image reading with a high speed by means of plural image sensors.

Still another object of the present invention is to provide an image reading apparatus utilizing plural image sensors and capable of automatic correction at the junction of images read by adjacent image sensors.

The foregoing and still other objects of the present invention will be made apparent from the following description.

BRIEF DESCRITPION OF THE DRAWINGS

DETAILED DESCRIPTION OF THE PREFERRED EMBODIMENTS

Figure 1:
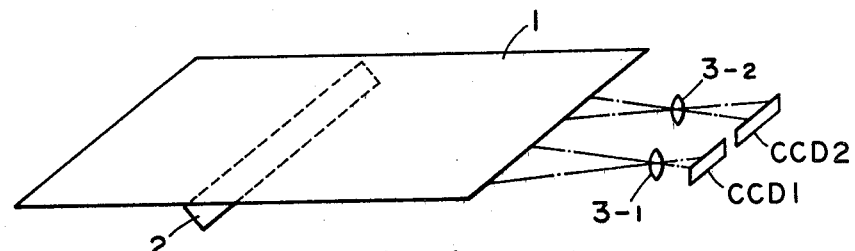
FIG. 1 is a perspective view of an original reading apparatus.
Figure 2:
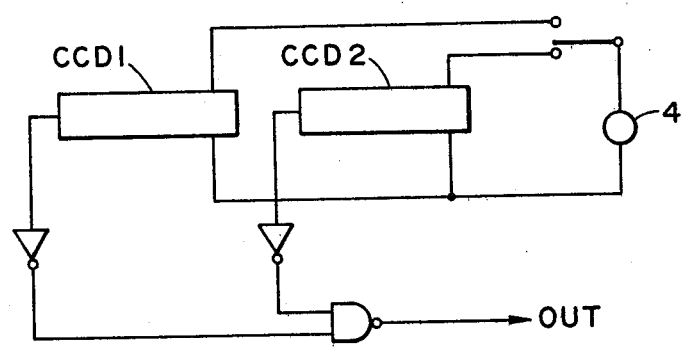
FIG. 2 is a block diagram of a conventional control circuit for image reading and signal read-out.
Figure 3:
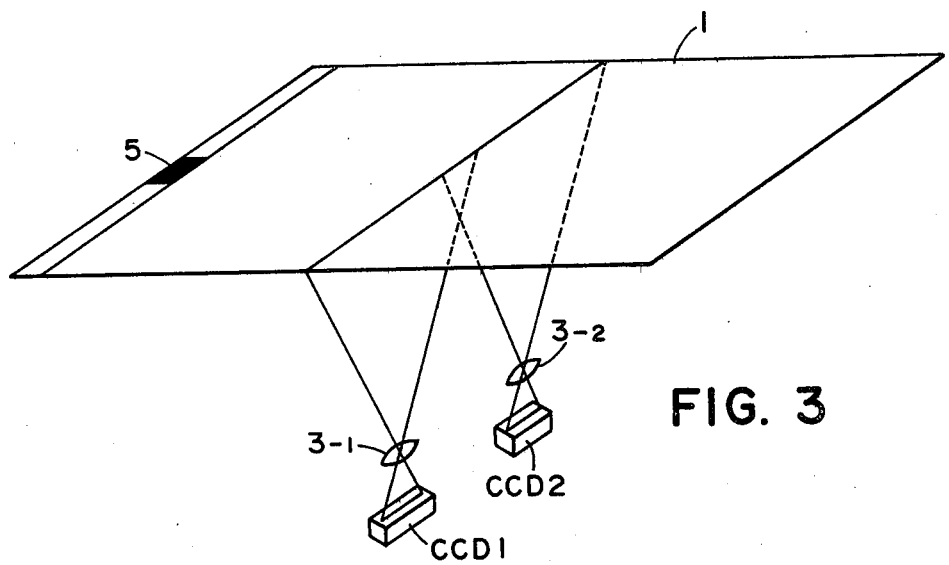
FIG. 3 is a schematic perspective view showing the image reading apparatus of the present invention.

FIG. 3 shows, in a schematic perspective view, the image reading apparatus of the present invention, in which an original 1 is read dividedly by image sensors CCD1, CCD2 arranged along the principal scanning direction in such a manner that the reading areas thereof overlap partially.

Prior to reading the original 1, the image sensors read a mark 5 provided outside the original area, and the extent of overlapping of the reading areas of two image sensors is identified from the signals obtained corresponding to said mark 5. In the subsequent image reading, plural image sensors are simultaneously activated and send the obtained signals to corresponding memories. A first memory corresponding to the first image sensor CCD1 sequentially stores the transmitted image signals in the determined memory areas, while a second memory corresponding to the second image sensor CCD2 delays the start timing of signal storage according to the extent of overlapping of the reading areas of two image sensors.

In this manner the second memory stores the image signals excluding the overlapping area read by two image sensors CCD1 and CCD2.

Figure 4:
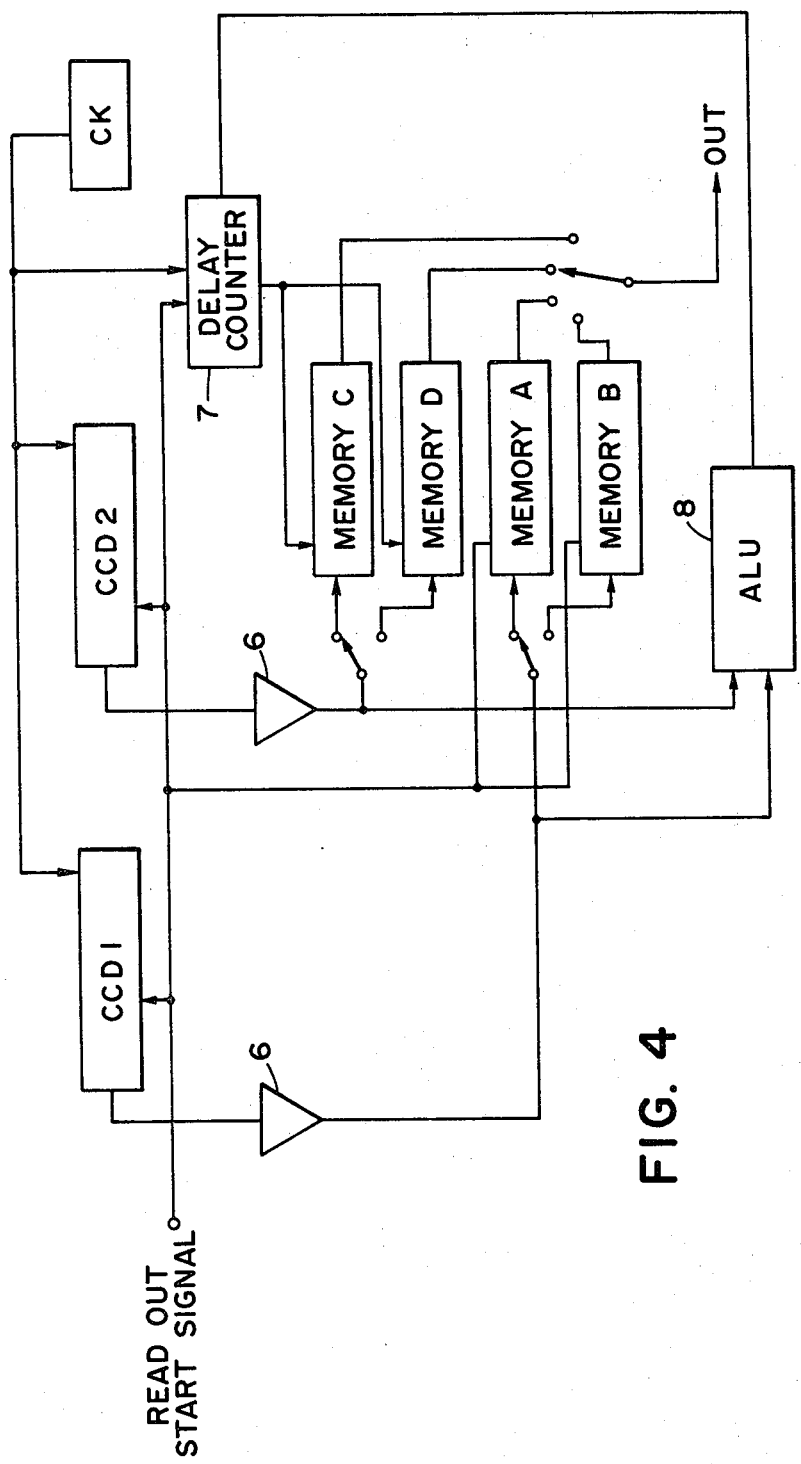
FIG. 4 is a block diagram of a control circuit for image reading and signal read-out according to the present invention.

FIG. 4 illustrates, in a block diagram, an embodiment of the reading control circuit according to the present invention, wherein shown are image sensors CCD1, CCD2; clock CK for supplying clock pulses for driving said image sensors CCD1, CCD2; a digitalizing circuit 6 for converting the output signals from said image sensors into digital signals; a delay counter 7; memories A, B, C and D each having a capacity at least equal to the number of pixels of said image sensor; and an arithmetic and logic unit 8.

Prior to the original reading, as explained in the foregoing, the image sensors CCD1, CCD2 read the mark 5 provided outside the original area as shown in FIG. 3, said mark 5 being formed of a black-out area slightly larger than the overlapped reading area of the two image sensors.

The arithmetic and logic unit (ALU) 8 counts the bit number and forms the sum thereof of the black signals read by two image sensors corresponding to said mark 5. Said sum always becomes larger than the bit number corresponding to the dimension of said mark 5, since the reading areas of two image sensors are mutually overlapped. Thus the bit number corresponding to the extent of overlapping of the reading areas of two image sensors can be determined by subtracting the bit number corresponding to the dimension of the mark 5 from the sum of bit numbers of the black signals read by two image sensors. The ALU 8 stores the thus determined number in the delay counter 7.

It will be easily understood that the mark 5 is not necessarily limited to the color black but can be of any other color as long as the read signal shows a level change at the boundary between the mark and the background.

Figure 5:
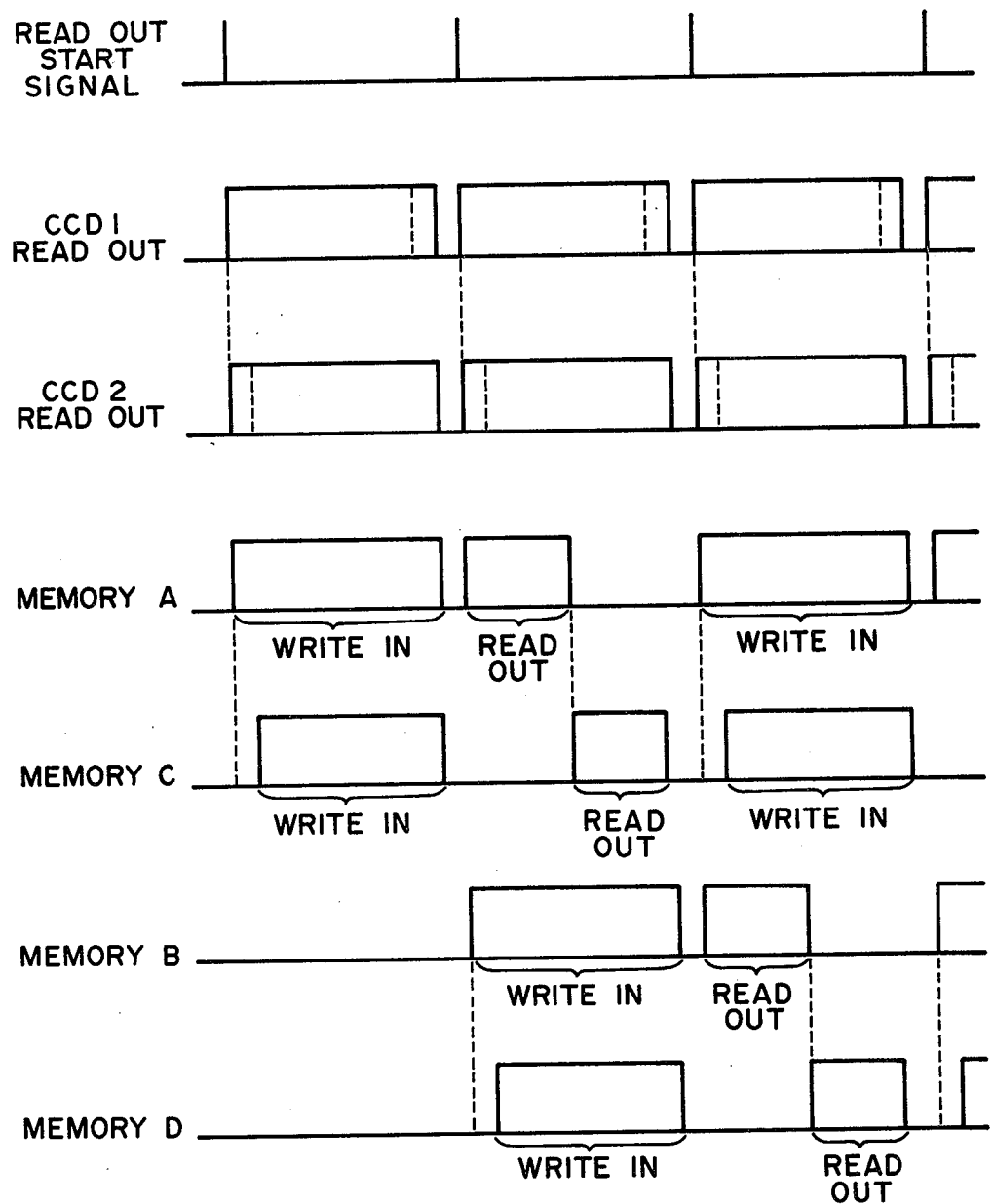
FIG. 5 is a timing chart showing the function of the circuit shown in FIG. 4.

FIG. 5 shows the timing of original reading. In response to a reading start signal for reading the original area, two image sensors are simultaneously activated to start reading according to the clock pulses and provide image signals, which are immediately converted into digital signals by the digitalizing circuit 6 and sent to memories. The first memory A or B corresponding to the image sensor CCD1 immediately initiates signal storage, but the second memory C or D corresponding to the image sensor CCD2 starts the storage after a delay corresponding to the bit number stored in the delay counter 7, whereby said second memory C or D sequentially stores the image signals corresponding to image information excluding the overlapping reading areas of two image sensors. Consequently said two memories provide, upon consecutive signal read-out, an image not containing overlapped image. The memories B and D are used for high-speed signal read-out while the memories A and C are used for storing signals from the image sensors, and vice versa. Such alternate use of memories allows high-speed image reading.

Since the image signals to be stored in the memories C and D do not contain the overlapping reading area of two image sensors, said memories always have surplus capacity after image reading. Such surplus capacity corresponding to no image reading may store white signals or may be left with no signals.

In the timing chart shown in FIG. 5, it is assumed that the speed of signal read-out from the memories is twice as fast as that of signal storage or write-in into said memories.

As explained in the foregoing, it is rendered possible to avoid overlapped signal storage in the memories resulting from the overlapped reading areas of image sensors and thus to obtain continuous signals of one slit line without overlapping or aberration, by detecting the dimension of the overlapped reading areas of image sensors and delaying the start of signal storage in the second memory in response to the thus detected dimension. Also a relatively simple circuit is capable of correcting the aberration at the junction betwee the reading areas of adjacent image sensors, while maintaining a high resolving power in a high-speed reading.

What I claim is:

1. An image reading apparatus, comprising:
   plural one-dimensional image sensors for reading an original;
   plural memory means respectively corresponding to said image sensors, wherein each of said plural memory means has a pair of memory units for storing image information from the associated one of said image sensors;
   driving means for driving each of said plural memory means such that one of said pair of memory units stores image information read in from the associated image sensor, while stored image information is read out from the other of said pair of memory units;
   detector means for detecting the size of an area of the original overlappingly read by a pair of adjacent image sensors; and
   control means for controlling a start timing of image information read-in in said plural memory means such that the read-in start time of the memory means associated with one of said adjacent pair of image sensors is delayed compared to the read-in start time of the memory means associated with the other of said adjacent pair of image sensors in accordance with a detection signal from said detector means.

2. An image reading apparatus according to claim 1, wherein said one-dimensional image sensors are arranged linearly.

3. An image reading apparatus according to claim 1, wherein said plural image sensors simultaneously read the original.

4. An image reading apparatus according to claim 1, further comprising:
   a mark provided on an original bearing means, said mark having a size which is greater than the dimension of the overlapping area and positioned at the location of the overlapping area and outside the area occupied by the original, and
   wherein said detector means detects the dimension of the overlapping area based on a signal obtained when said image sensors read the mark.

5. An image reading apparatus according to claim 1, wherein the image information stored in said plural memory means is continuously read out.

6. An image reading apparatus according to claim 1, wherein said driving means causes the read-out of stored image information at a higher speed than the read-in of the image information into said memory means.

* * * * *

UNITED STATES PATENT AND TRADEMARK OFFICE
CERTIFICATE OF CORRECTION

PATENT NO. : 4,465,939

DATED : August 14, 1984

INVENTOR(S) : Yasuyuki Tamura

It is certified that error appears in the above-identified patent and that said Letters Patent is hereby corrected as shown below: Title page, item [56]

References Cited: In U.S. Patent No. 4,249,217, change "2/1918" to --2/1981--.

Column 1, line 24, change "recorder a" to --a recorder--.

Column 2, line 9, change "propopsed" to --proposed--;

line 31, change "$10^{-3}$" to --$10^{-1}$--;

line 35, delete "under";

line 56, change "DESCRITPION" to --DESCRIPTION--.

Column 4, line 31, after "response" insert --to--;

line 33, change "betwee" to --between--.

Signed and Sealed this

Thirtieth Day of April 1985

[SEAL]

Attest:

DONALD J. QUIGG

Attesting Officer  Acting Commissioner of Patents and Trademarks